United States Patent Office 3,458,219
Patented July 29, 1969

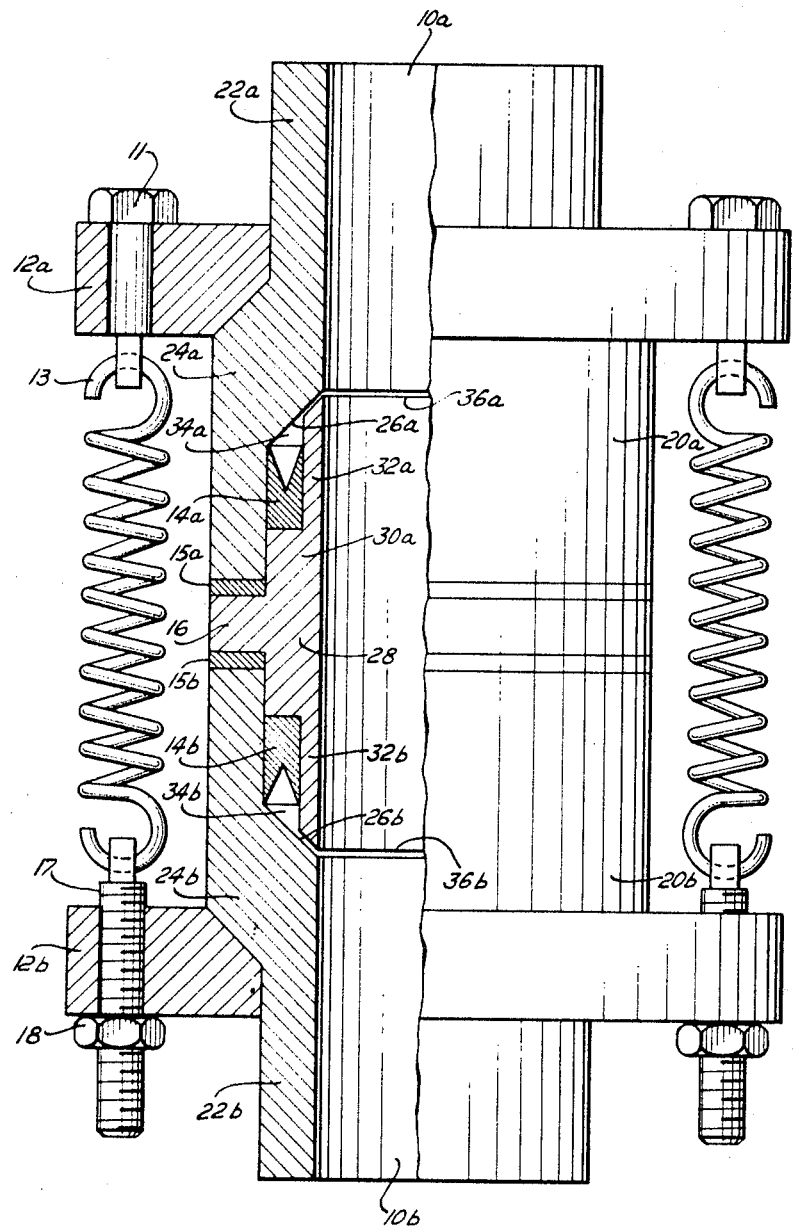

3,458,219
PIPE CONNECTION
Ludwig Wesch, Heidelberg, Germany, assignor to Mancar-Trust, Vaduz, Liechtenstein, a firm
Filed June 7, 1967, Ser. No. 644,161
Int. Cl. F16b 7/00; F16d 1/00; F16h 21/00
U.S. Cl. 285—110          8 Claims

ABSTRACT OF THE DISCLOSURE

A pipe connection wherein a pair of pipes which respectively have open enlarged elongated end portions are positioned with their enlarged end portions directed toward and located adjacent to each other. Inwardly of their enlarged end portions the pair of pipes have portions of a smaller diameter than these enlarged end portions, and the smaller-diameter portions of the pipes are interconnected with the enlarged end portions thereof by frustoconical pipe portions which respectively provide the pipes with inner frustoconical surfaces which are directed toward each other. An intermediate unit is situated between the pair of pipes and has an elongated tubular member extending into the enlarged end portions of the pipes and directly engaging the pipes at their enlarged end portions, this tubular member terminating in a pair of opposed elongated end portions thinner than portions of the tubular member which directly engage the elongated end portions of the pipes and defining with the elongated end portions of the pipes a pair of annular gaps. The intermediate unit is of a softer material than the pipes themselves and has an outer flange situated between the pair of end portions of the pipes. Three sealing means are provided for providing three sealed joints between the intermediate unit and each of the pipes with these three sealed joints axially spaced with respect to each other along the intermediate unit. The thinner wall portions of the tubular member at its opposed ends are capable of being deformed and terminate in relatively thin edges capable of being deflected against the inner frustoconical surfaces of the pipes in response to radial pressures so as to form one of these sealing means which thus provides one of the sealed joints between the intermediate unit and each of the pipes. A pair of sealing rings are respectively situated in the annular gaps between the thinner wall portions of the tubular member and the enlarged end portions of the pipes, so that these sealing rings each form the second of the sealing means, thus providing the second sealed joint between the intermediate unit and each of the pipes. Finally, a second pair of sealing rings are located between an outer flange of the intermediate unit and the pair of enlarged end portions of the pipes, engaging these enlarged end portions and the flange of the intermediate unit so as to provide in this way the third sealing means and thus the third sealed joint between the intermediate member and each of the pipes.

Background of the invention

The present invention relates to pipe connections.
There are at present time many known structures for interconnecting pipes, and the present invention relates particularly to pipe connections suitable for interconnecting pipes which are made of synthetic plastic materials.
As soon as structures of this latter type are subjected to relatively high pressure and in addition to high temperatures, difficulties are encountered with all known structures, these difficulties resulting on the one hand from the longitudinal expansion of the pipes and on the other hand from structural factors such as delamination of the pipes, particularly where the pipes are, for example, reinforced with glass fibers.

Summary of the invention

It is, therefore, a primary object of the present invention to provide a pipe connection of the above general type which is capable of reliably maintaining a sealed connection between the pipes even under conditions where they are subjected to high pressures.
In addition, it is an object of the present invention to provide a construction which will enable relatively long pipes to be interconnected with each other even through they are subjected to considerable longitudinal expansion due to relatively high temperatures.
Furthermore, it is an object of the present invention to provide a pipe connection which is capable of withstanding considerable radial forces and expansion while at the same time maintaining a reliable seal even under conditions of increasing pressure and temperature.
Furthermore, it is an object of the present invention to provide a construction where the connection between the pipes is not rigid but instead provides the possibility of permitting one of the pipes to have a relatively small angular displacement with respect to the other of the pipes.
Also, it is an object of the invention to provide a pipe connection which is of a relatively simple construction and which in particular is suitable for use with pipes which are wound from filaments.
Also, it is an object of the invention to provide a pipe connecting structure having components which may be prefabricated before assembly of the components of the pipe connection while at the same time being adapted to the particular purposes for which the pipes are intended.
In accordance with the invention the pipe connection includes a pair of pipes which respectively terminate in enlarged end portions which are open and which are directed toward and loacted adjacent each other. Inwardly of their enlarged end portions the pair of pipes have elongated portions of a smaller diameter than the enlarged end portions, and these smaller-diameter portions of the pipes are interconnected with the enlarged end portions thereof by frustoconical pipe portions which respectively provide the pipes with inner frustoconical surfaces which are directed toward each other. An intermediate unit is situated between the pipes and includes an elongated tubular member extending into the enlarged end portions and having relatively thick wall portions directly engaging these enlarged end portions. This tubular member has a pair of opposed ends formed by wall portions which are substantially thinner than the relatively thick wall portions and which directly engage the enlarged ends of the pipe, and these thinner opposed end wall portions of the tubular member define with the enlarged end portions a pair of annular gaps. The tubular member is made of a material softer than the pipes and capable of being deformed and bent in response to radial pressure, particularly at the thinner end portions of the tubular member. These thinner end portions terminate in relatively thin edges which are capable of being deflected in response to radial pressure directly into engagement with the inner frustoconical surface portions of the pipe so as to provide in this way one sealing means which forms one sealed joint between the intermediate member and each pipe. A pair of sealing rings are respectively loacted in the pair of annular gaps between the thinner wall portions of the tubular member and the enlarged end portions of the pipes forming in this way a second sealing means which provides a second sealed joint between the intermediante unit and each of the pipes, and this second sealing means is axially displaced with respect to the first sealing means. The intermediate unit has projecting from its tubular-member an outer flange which is situated between the enlarged end portions of the pipes, and a second pair of sealing rings engage the enlarged end portions of the pipes and this outer flange of the intermediate unit to provide a third sealing means and thus a third sealed joint, between the intermediate unit and each of the pipes. This third sealing means is axially displaced with respect to the first and second sealing means.

Brief description of the drawing

The invention is illustrated by way of example in the accompanying drawing which forms part of this application and in which one possible construction according to the present invention is shown partly in a longitudinal sectional elevation and partly in a side elevation.

Referring now to the drawing, there are illustrated therein a pair of pipes 10a and 10b which are to be connected to each other with the structure of the invention. These pipes respectively have enlarged end portions 20a and 20b which are of a substantially larger diameter than the elongated portions 22a and 22b of the pipes. These elongated smaller-diameter portions 22a and 22b of the pipes are interconnected with their enlarged end portions 20a and 20b by frustoconical pipe portions 24a and 24b which respectively provide the pipes with inner frustoconical surfaces 26a and 26b which are directed toward each other.

The pipes 10a and 10b are urged toward each other by a structure which includes a pair of rings 12a and 12b which have inner diameters smaller than the outer diameters of the enlarged end portions 20a and 20b and which have, in addition, inner frustoconical surfaces engaging the outer frustoconical surfaces of the pipes, as is apparent from the drawing. A plurality of spring means urge the rings 12a and 12b toward each other so as also to urge the pipes toward each other, and the plurality of spring means are circumferentially distributed about the pipes. Each spring means includes a bolt 11 extending through a bore of the ring 12a and terminating in an eye which receives an end of an elongated, coiled, tension spring 13 which forms part of the spring means and which is thus hooked onto the bolt 11. Each spring means further includes a threaded stud extending through a bore of the ring 12b and terminating in an eye to which the other end of the coiled tension spring 13 is attached in the manner indicated in the drawing. A nut 18 is threaded onto the stud 17 and engages that face of the ring 12b which is directed away from the ring 12a. Thus, each spring means includes the assembly of the coil spring 13 and the elements 11 and 17 while an adjusting means in the form of a nut 18 coacts with each spring means for adjusting the force of the spring 13 thereof.

The pipes 10a and 10b are formed from synthetic plastics reinforced by glass fibers, and, irrespective of whether the pipes are formed by centrifugal casting or by winding of a filamentary structure, in order to avoid interlaminar shearing forces, woven rovings which extend longitudinally of the pipes are embedded in the latter and are longitudinally oriented. As a general rule of thumb, these ropes which are embedded in the pipe are provided all the way up to the ends of the pipes with a length which is at least double the pipe diameter.

The enlarged end portions 20a and 20b of the pipes are capable of receiving an intermediate unit 16 having an elongated tubular member 28 having relatively thick wall portions 30a and 30b which directly engage the enlarged end portions 20a and 20b, respectively, at their inner surfaces. The elongated tubular member 28 of the intermediate unit 16 terminates in a pair of opposed elongated end portions 32a and 32b which have a wall thickness substantially less than that of the relatively thick portions 30a and 30b. These thinner end wall portions 32a and 32b define with the enlarged end portions 20a and 20b a pair of annular gaps 34a and 34b, respectively. The thinner wall portions 32a and 32b of the intermediate member 16 terminate adjacent to the inner frustoconical surfaces 26a and 26b, respectively, and at their extremities these thinner wall portions 32a and 32b are tapered to relatively thin end edges 36a and 36b. Between the enlarged end portions 20a and 20b of the pipes 10a and 10b the intermediate unit 16 has an outwardly directed flange 38.

Thus, it will be seen that the intermediate unit 16 has several purposes. In the first place, it has an intermediate relatively thick portion provided with the walls 30a and 30b which are directly received within and engage the inner surfaces of the enlarged end portions 20a and 20b, and this relatively thick portion has the outer flange 38 whose outer surface has a diameter equalling the outer diameter of the enlarged end portions 20a and 20b. Between the flange 38 and the end portion 20a and 20b there are a pair of sealing rings 15a, 15b each of which forms a sealing means providing a sealed joint between the intermediate unit 16 and each pipe.

The intermediate unit 16 has the relatively thin extensions 32a and 32b which in cross section have the configuration of tongues, and the construction of these thin-walled portions 32a and 32b is such that they are capable of directly engaging the inner frustoconical surfaces 26a and 26b during assembly of the components while at the same time defining the annular gaps 34a and 34b in which a pair of additional sealing rings 14a and 14b are located. Thus, the sealing rings 14a and 14b are situated in the gaps 34a and 34b engaging the enlarged end portions 20a and 20b at their inner surfaces and the thin-walled portions 32a and 32b at their outer surfaces, so that in this way the pair of sealing rings 14a and 14b form a second pair of sealing means each providing a second sealed joint between the intermediate unit 16 and each pipe at a location which is axially displaced from the sealed joint provided by each sealing ring 15. The sealing rings 14a and 14b are split in the sense that their outer end faces, which are directed away from each other, are respectively formed with the V-grooves illustrated in the drawing, thus providing these sealing rings 14a and 14b with pairs of thin edges capable of pressing against the enlarged end portions 20a and 20b and the thin-walled portions 32a and 32b.

The intermediate unit 16 is made of a material which is softer than the pipes 10a and 10b. Moreover, the material used for the intermediate unit 16 is capable of being deformed and bent, particularly at the thin-walled 32a and 32b portions thereof. Therefore, in response to radial forces which act on the intermediate unit 16, the tapered end portions 36a and 36b thereof will be deflected against the seal rings 14a and 14b and will have a pressing engagement with the inner frustoconical surfaces 26a and 26b, thus providing in this way a third sealing means and a third sealed joint between the intermediate unit 16 and each pipe. Therefore, the deflection of the ends of the intermediate unit against the inner frustconical surfaces 26a and 26b will provide a self-sealing between the intermediate unit and the pipes. However, in addition the sealing rings 14a and 14b have a sealing function which increases with increasing radial and longitudinal pressures, and together with the sealing rings 15 there is a triple action provided between the intermediate unit 16 and each pipe making it possible to utilize the connection of the invention even with pipe couplings which are required to operate at pressures greater than 100 atmospheres and which will operate favorable even at temperatures on the order of 100° C. The greater the extent of longitudinal expansion of the pipes, the greater the pressure which acts on the sealing structure and thus the better the fit between the intermediate unit and the inner frustoconical surfaces 26a and 26b.

In the event that it is desired to arrange the pipes 10a and 10b, not along a common axis, but rather with one of the pipes at a slight angle with respect to the other of the pipes, then it is only required to provide the sealing rings 15a and 15b with thicker portions at one of both sides thereof so as to situate the intermediate unit 16 at a somewhat greater distance from the inner frustoconical surface 26a or 26b of one of the pipes, and this one pipe may then be tilted with respect to the other pipe until its inner frustoconical surface agains engages the intermediate member 16. Any one-sided increase in the gap between the intermediate unit and an inner frustoconical surface of one of the pipes can be easily compensated by making the intermediate member of a material whose composition will increase the deformability of the intermediate unit so that it will be capable of being deflected into engagement with and fit against the inner frustoconical surfaces of the pipes.

One of the advantages of the above-described structure of the invention resides in the simplicity of its manufacture, which is of particular importance in connection with pipes formed by wound filaments. The intermediate unit 16 can be very precisely prefabricated and adapted to the particular functions which are to be performed by the pipe connection. Moreover, it is not required that in the case of intense longitudinal expansion only short pipe lengths be used. Instead with the pipe connection of the invention it is possible to use without any difficulty pipes of up to 12 m. in length. With suitable dimensions of the intermediate unit 16, the primary part of the longitudinal forces is absorbed by the intermediate unit which may be manufactured under compression in a suitable press so as to be easily maintained free of interior delamination effects. It is best to use for the intermediate unit 16 a special compressed mass which is capable of being filled to a large extent with particulated quartz, in the form of quartz powder, for example. Furthermore, instead of using only a single resin for the intermediate unit, a special resin can be selected which need not be identical with the casting resin of the pipes.

Furthermore, it is apparent that the above-described structure of the invention is not limited to use for interconnecting pipes made of synthetic plastics and reinforced with glass fibers. The pipe connection of the invention can be used with all types of pipes and even can be used for connections between plastic and metal pipes.

What is claimed is:

1. A pipe connection comprising a pair of pipes respectively terminating in enlarged open end portions directed toward and located adjacent each other, said pipes respectively having adjacent said enlarged end portions thereof elongated pipe portions of a smaller diameter than said enlarged end portions and said pipes respectively having between said enlarged end portions and said smaller-diameter portions thereof frustoconical portions providing said pipes at the junctions between said enlarged end portions and smaller-diameter portions thereof with inner frustoconical surfaces which are directed toward each other, an intermediate unit having an elongated tubular member extending into said enlarged end portions of said pipes and terminating in a pair of opposed ends respectively situated adjacent said inner frustoconical surfaces of said pipes, said intermediate unit having between said ends thereof an outer flange extending between said enlarged end portions of said pipes, and three sealing means situated between said intermediate unit and each of said pipes and being axially displaced with respect to each other along said intermediate unit for providing three sealed joints between said intermediate unit and each pipe respectively at three locations axially displaced with respect to each other along said intermediate unit; and wherein a pair of outer rings of a smaller inner diameter than the outer diameter of said enlarged end portions of said pipes engage the latter at said frustoconical portions thereof, a plurality of spring means each extending between and operatively connected to said outer rings for urging them toward each other, said plurality of spring means being circumferentially uniformly distributed about said pipes at the exterior thereof, so that through said plurality of spring means and said outer rings said pipes are urged toward each other to compress said flange of said intermediate unit therebetween, and adjusting means coacting with each of said plurality of spring means for adjusting the spring force thereof.

2. The combination of claim 1 and wherein a pair of sealing rings are respectively situated between and in engagement with said enlarged end portions of said pipes and said flange of said intermediate unit for providing one of said sealing means and thus one of said sealed joints between said intermediate unit and each of said pipes.

3. The combination of claim 1 and wherein said intermediate unit has in the region of said flange thereof a relatively thick wall portion directly engaging an inner surface of each enlarged end portion of each pipe and said intermediate unit having in the region of said opposed ends thereof and the region of said inner frustoconical surfaces thinner wall portions substantially thinner than said relatively thick wall portions which directly engage said enlarged end portions of said pipe, said thinner wall portions of said intermediate unit being spaced inwardly from said enlarged end portions of said pipe and respectively defining a pair of annular gaps therewith, and said relatively thin wall portions of said intermediate respectively terminating in tapered deformable edge portions capable of being deflected by radial pressure against said inner frustoconical surfaces of said pipes for providing one of said sealing means and thus one of said sealed joints between said intermediate unit and each of said pipes.

4. The combination of claim 3 and wherein a pair of sealing rings are respectively situated in said annular gaps between said thinner wall portions of said intermediate unit and said enlarged end portions of said pipes for providing a second sealing means and thus a second sealed joint between said intermediate unit and each of said pipes.

5. The combination of claim 4 and wherein said pair of sealing rings respectively have end faces directed away from each other respectively toward said inner frustoconical surfaces of said pipes and said end faces respectively being formed with V-grooves.

6. The combination of claim 4 and wherein a second pair of sealing rings are situated between and in engagement with said flange and said enlarged end portions of said pipes for providing said third sealing means and thus said third sealed joint between said intermediate unit and each of said pipes.

7. The combination of claim 1 and wherein said intermediate unit is composed of a pressed mass of material reinforced with quartz powder.

8. The combination of claim 1 and wherein each of said spring means includes an elongated, coiled tension spring extending between and operatively connected with one of said outer rings, and the other of said outer rings being formed with a bore passing therethrough and each spring means including a threaded stud extending through the latter bore and connected to the other end of each coiled tension spring, and said adjusting means including a nut threaded on to said threaded stud and engaging that face of said other outer ring which is directed away from said one outer ring so that by turning said nut on said stud the tension of each spring can be adjusted.

References Cited

UNITED STATES PATENTS

| | | | |
|---|---|---|---|
| 504,739 | 9/1893 | Murray | 285—351 X |
| 740,664 | 11/1903 | Kroll | 285—111 |
| 763,101 | 6/1904 | Jones | 285—114 X |
| 969,254 | 9/1910 | Delattre | 285—223 |
| 1,426,724 | 8/1922 | Fyffe | 285—370 |
| 2,287,142 | 6/1942 | Simmonds | 285—371 X |

(Other references on following page)

| | UNITED STATES PATENTS | | |
|---|---|---|---|
| 2,862,731 | 12/1958 | Hedden et al. | 285—370 X |
| 3,216,746 | 11/1965 | Watts | 285—370 X |

FOREIGN PATENTS

| 312,479 | 2/1918 | Germany. |
|---|---|---|
| 267,697 | 3/1927 | Great Britain. |
| 443,317 | 2/1936 | Great Britain. |
| 793,309 | 4/1958 | Great Britain. |
| 529,240 | 6/1955 | Italy. |

CARL W. TOMLIN, Primary Examiner

D. W. AROLA, Assistant Examiner

U.S. Cl. X.R.

277—171; 285—334.2, 351, 364, 370, 423